US008792371B2

(12) United States Patent
Woo

(10) Patent No.: US 8,792,371 B2
(45) Date of Patent: Jul. 29, 2014

(54) METHOD FOR DETERMINING A GROUP OWNER IN A WIRELESS NETWORK

(75) Inventor: Jooin Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 13/157,072

(22) Filed: Jun. 9, 2011

(65) Prior Publication Data

US 2012/0106375 A1 May 3, 2012

(30) Foreign Application Priority Data

Nov. 2, 2010 (KR) ........................ 10-2010-0108260

(51) Int. Cl.
*H04L 12/56* (2006.01)
*H04W 4/00* (2009.01)

(52) U.S. Cl.
USPC ......................................... 370/252; 370/328

(58) Field of Classification Search
USPC ................................................ 709/201–213
See application file for complete search history.

(56) References Cited

U.S. PATENT DOCUMENTS

| 2007/0091889 | A1* | 4/2007 | Xiao et al. | 370/390 |
| 2007/0283002 | A1* | 12/2007 | Bornhoevd et al. | 709/224 |
| 2008/0112364 | A1* | 5/2008 | Kwon et al. | 370/331 |
| 2009/0102965 | A1* | 4/2009 | Ogawa | 348/372 |
| 2009/0210545 | A1* | 8/2009 | Wright | 709/230 |
| 2011/0093536 | A1* | 4/2011 | Wentink | 709/204 |
| 2011/0225305 | A1* | 9/2011 | Vedantham et al. | 709/227 |

* cited by examiner

*Primary Examiner* — Ayaz Sheikh
*Assistant Examiner* — Debebe Asefa
(74) *Attorney, Agent, or Firm* — Birch, Stewart, Kolasch & Birch, LLP

(57) ABSTRACT

A method for a device to determine a group owner that functions as an access point in a wireless network is provided. In the method, a first device acquires first intention information indicating the first device's intention to become a group owner and receives, from a second device, second intention information indicating the second device's intention to become a group owner, and compares the first intention information and the second intention information to determine that one of the first and second devices is a group owner. This method enables smooth communication between devices in a wireless network since a device which has more available power or can operate for a longer time can become a group owner.

10 Claims, 6 Drawing Sheets

METHOD FOR DETERMINING A GROUP OWNER IN A WIRELESS NETWORK

CROSS-REFERENCE TO RELATED APPLICATION

This application claims the priority benefit of Korean Patent Application No. 10-2010-0108260, filed on Nov. 2, 2010 in the Korean Intellectual Property Office, the disclosure of which is incorporated herein by reference.

BACKGROUND OF THE INVENTION

1. Field of the Invention

The present invention relates to a method for devices to perform communication in a wireless network, and more particularly to a method for determining a group owner in a wireless network.

2. Description of the Related Art

A conventional wireless LAN or Wi-Fi network is generally based on presence of a control device that is called a "wireless access point". The control device generally has three basic functions, i.e., a function to physically support wireless or wired networking, bridging and routing functions to enable bridging and routing within the network, and a provisioning function to add and controls devices in the network.

A typical Wi-Fi network includes wired connections to a broadband provider, an access point, computers connected through wired or wireless connections, and other devices. Most Wi-Fi networks are set to an "infrastructure mode" in which the access point operates as a central hub of all network devices. Additional access point may be added to the Wi-Fi network in order to extend the range of the network.

In the meantime, the usefulness of the basic model of a simple router such as a smart computer has decreased as the number of devices added to the Wi-Fi system and the number of types of such devices have increased. In addition, the difficulty of installation of the Wi-Fi network has increased as the number of access points has increased.

A variety of communication methods have been developed to overcome such problems. In particular, a method, which allows a device to directly perform the access point functions to enable direct communication between devices, is under discussion.

SUMMARY OF THE INVENTION

The present invention provides a method and system for determining a device (i.e., a group owner) that performs access point functions in a wireless network in which devices perform direct communication with each other.

According to an aspect of the present invention, there is provided a method for determining a group owner that functions as an access point in a wireless network that allows direct communication between devices, the method including a first device acquiring first intention information indicating the first device's intention to become a group owner, receiving, from a second device, second intention information indicating the second device's intention to become a group owner, and comparing the first intention information and the second intention information and determining that one of the first and second devices is a group owner.

According to another aspect of the present invention, there is provided a device for determining a group owner that functions as an access point in a wireless network that allows direct communication between devices, the device including a wireless communication unit for performing wireless communication with another device, and a controller for acquiring first intention information indicating the device's intention to become a group owner, receiving, from the other device, second intention information indicating the other device's intention to become a group owner through the wireless communication unit, and comparing the first intention information and the second intention information to determine that one of the device and the other device is a group owner.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention will be described in more detail with reference to the attached drawings.

Figure 1A:
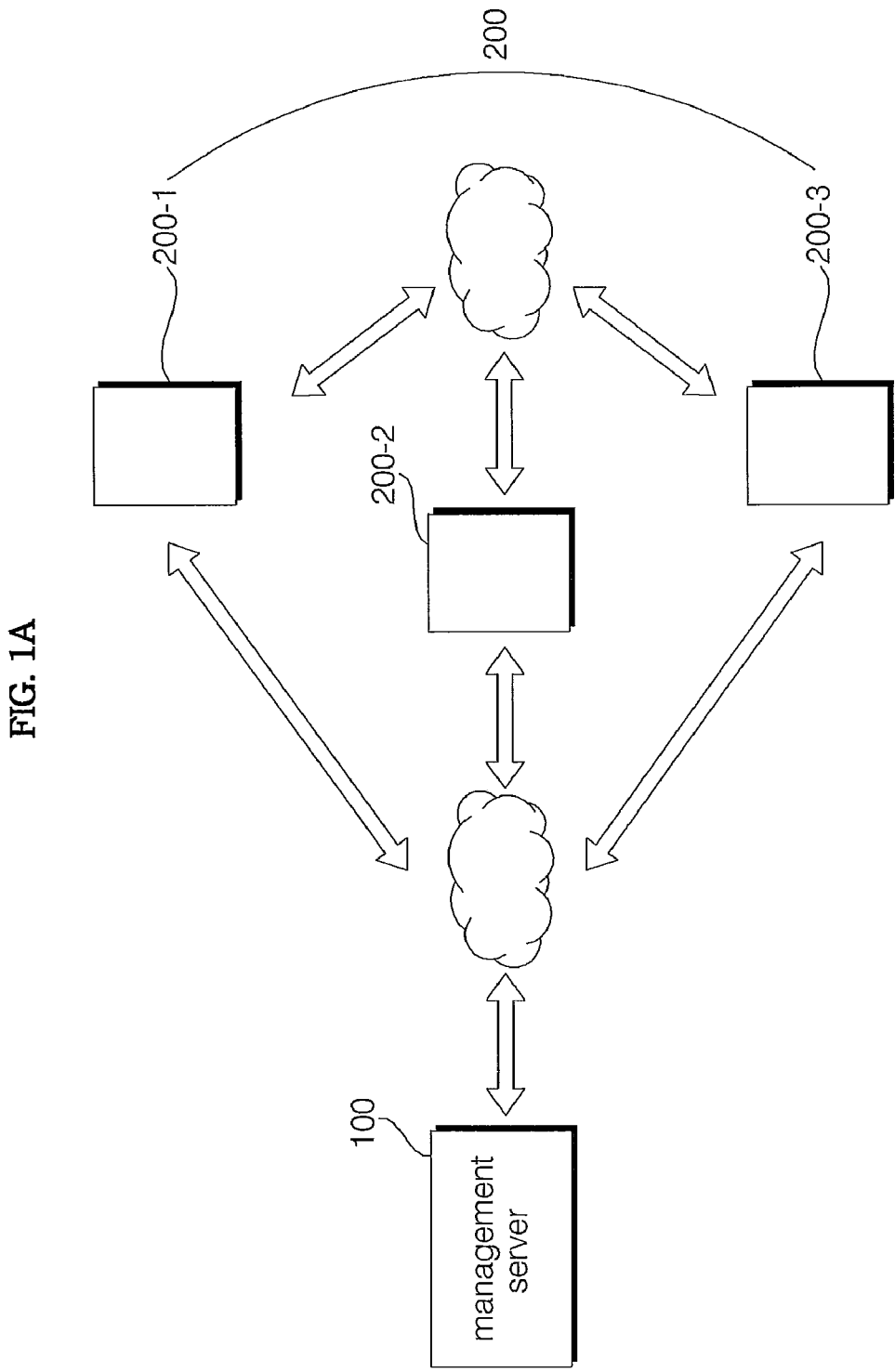
FIG. 1A is a schematic diagram of a system in a wireless network according to the present invention.
Figure 1B:
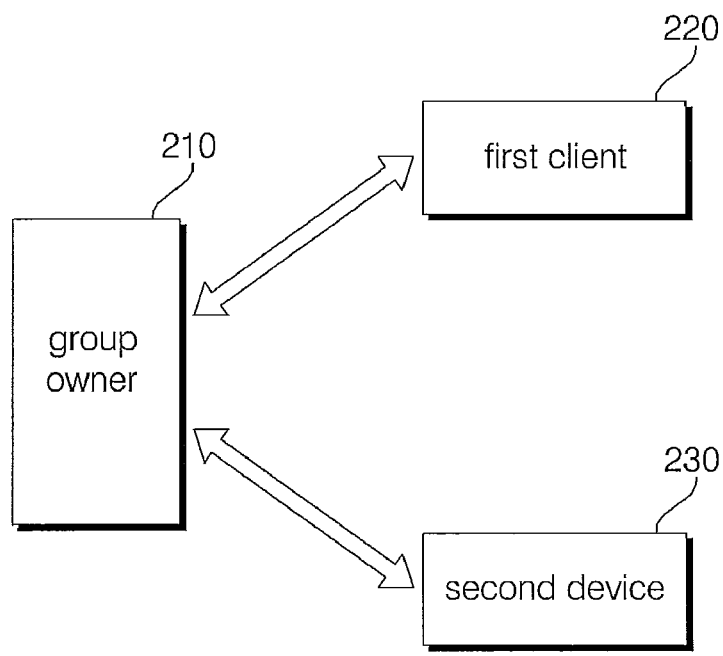
FIG. 1B illustrates a topology of a group owner in a wireless network.

FIG. 1A is a schematic diagram of a system in a wireless network according to the present invention and FIG. 1B illustrates a topology of a group owner in a wireless network.

As shown in FIG. 1A, the system in the wireless network includes a management server 100 and at least two devices 200 which are managed by the management server 100 and which can directly communicate with each other through the network.

The management server 100 is responsible for minimal management functions including a function to transmit network access information including respective IP addresses of the devices 200 to the devices 200 and most other functions are shared by the devices 200-1, 200-2, and 200-3.

In order to achieve direct communication between devices, one of the devices is set as a group owner and others are set as clients. The group owner performs access point functions, i.e., a function to physically support wireless or wired networking, bridging and routing functions to enable bridging and routing within the network, and a provisioning function to add devices to the network and to control the devices from the network. When one of the devices is determined to be a group owner 210, the group owner 210 communicates with at least one of the clients 220 and 230 as shown in FIG. 1B. Devices that form a group use a single group identifier and can use one security domain. The group owner 210 may perform communication with the clients 220 and 230 to transmit or receive content to or from each of the clients and may also perform an AP function to relay content received from one client 220 to another client 230.

The devices applied to the present invention include a desktop computer, a server, a mobile phone, a smart phone, a laptop computer, a digital broadcast terminal, a Personal Digital Assistant (PDA), a Portable Multimedia Player (PMP), a navigation system, and the like. The devices 200 directly exchange information with each other through a wireless network.

In order to achieve direct communication between a plurality of devices 200, one of the plurality of devices 200 is determined to be a group owner that functions as an access point and the other devices are determined to be clients as described above.

A method for determining a group owner from a plurality of devices 200 is described below in detail.

Figure 2:
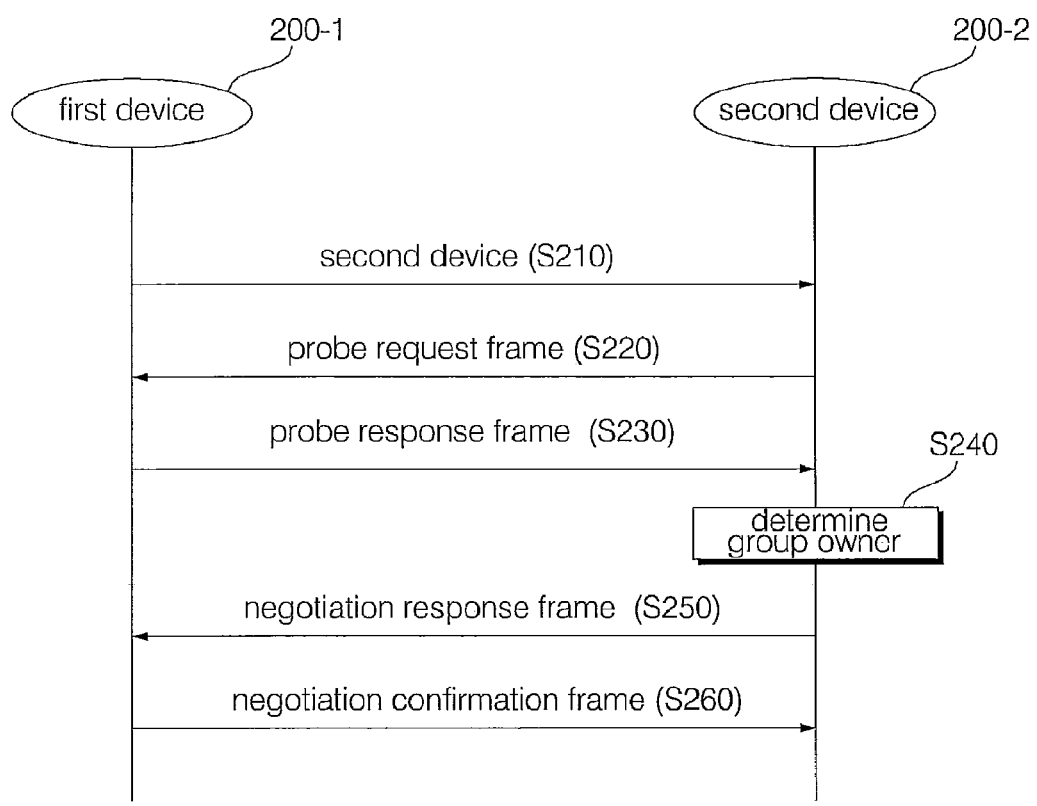
FIG. 2 is a flow chart illustrating a method for determining a group owner for forming a group in a wireless network according to an embodiment of the present invention.

FIG. 2 is a flow chart illustrating a method for determining a group owner for forming a group in a wireless network according to an embodiment of the present invention. The wireless network includes a first device 200-1 and at least one second device 200-2. The term "first device 200-1" refers to a device 200 that has started wireless communication and the term "second device 200-2" refers to a device 200 that responds to a request from the first device 200-1 and becomes a wireless network counterpart to the first device 200-1.

As shown in FIG. 2, the first device 200-1 broadcasts a probe request frame in order to search for a device which can communicate with the first device 200-1 (S210). A second device 200-2 which can communicate with the first device 200-1 transmits a probe response frame to the first device 200-1 in response to the probe request frame (S220). The response frame may include information (for example, a device name, a device type, etc.) regarding the second device 200-2 which can communicate with the first device 200-1. The first device 200-1 and the second device 200-2 which has transmitted the response frame may form a group. To form a group, there is a need to determine a group owner.

The first device 200-1 generates a request frame for negotiation of group owner determination with the second device 200-2 and transmits the request frame to the second device 200-2 (S230). The request frame will hereinafter be referred to as a "negotiation request frame". The group owner performs the same function as an access point which broadcasts a probe request frame after forming a group in a wired/wireless network and allows information to be transmitted between devices 200.

The negotiation request frame preferably includes a performance field, an information field, intention information, an intention field, a timeout field, an address field, a channel list field, a channel field, and an attribute field. The performance field includes information of characteristics used when the device is determined to be a group owner. The information field includes information regarding the type of the device. The intention field includes intention information which indicates the device's intention to become a group owner. The timeout field includes the maximum time required until provisioning starts after the device completes group owner negotiation. The address field includes an address to be used for provisioning after group owner negotiation is successively completed. The channel list field includes operation channels that are available when the device has become a group owner. The channel field includes information indicating an operation channel of the device. The attribute field includes information indicating the source of provisioning information.

More specifically, the performance field includes a group performance bitmap field indicating characteristics of a wireless group. The group performance bitmap field may include information indicating whether the wireless group to be formed is a persistent or temporary wireless group, information indicating whether or not the first device 200-1 is permitted for the wireless group, and information indicating whether or not communication between devices is supported.

The channel list field includes information of operation channels of the wireless group that are available when the first device 200-1 has become a group owner and the channel field includes information of a favorite operation channel.

The intention field includes information indicating the degree of the intention of the first device 200-1 to become a group owner and the intention information is divided into main intention information and auxiliary intention information. The main intention information is primarily used when the group owner is determined. The main intention information is preset by a user, a provider, or the like or is determined based on power supply status information. The main intention information can be set to an integer in a range from 0 to 15. The auxiliary intention information is secondarily used to determine the group owner when the main intention information of the first device 200-1 is the same as that of the second device 200-2. The auxiliary intention information may be toggled between 0 and 1. Devices preferably toggle their auxiliary intention information such that the second device 200-2 toggles its auxiliary intention information to "0" to generate a negotiation response frame when the first device 200-1 toggles its auxiliary intention information to "1" to generate a negotiation request frame. The degree of the intention to become a group owner increases as the value of each of the main intention information and the auxiliary intention information increases. A device whose main intention information has a value of "15' may become a group owner.

On the other hand, the second device 200-2, which has received the negotiation request flame, decides whether or not to form a group with the first device 200-1 and determines a group owner (i.e., determines one of the first and second devices 200-1 and 200-2 to be a group owner) upon deciding to form a group with the first device 200-1 (S240). The second device 200-2 then transmits a negotiation response frame including information regarding the group owner to the first device 200-1 (S250).

Similar to the negotiation request frame, the negotiation response frame includes a performance field, an information field, an intention field, a timeout field, an address field, a channel list field, a channel field, and an attribute field, and may also include a field (hereinafter referred to as "status field") including information (hereinafter referred to as "status information") indicating a status associated with the possibility to form a group.

Specifically, when the second device 200-2 has decided not to form a group with the first device 200-1, the second device 200-2 generates a negotiation response frame including status information "failure". For example, when the second device 200-2 does not have provisioning information, when the second device 200-2 has already formed a group with another device, or when both the first device 200-1 and the second device 200-2 should become a group owner, the second device 200-2 may send a negotiation response frame including status information "failure".

On the other hand, when the second device 200-2 has decided to form a group with the first device 200-1, the second device 200-2 generates and transmits a negotiation response frame including status information "success". To generate a negotiation response frame including status information "success", the second device 200-2 must not have formed a group while having provisioning information and the main intention information of at least one of the first device 200-1 and the second device 200-2 must have a value other than 15.

The second device 200-2 compares its intention information with intention information of the first device 200-1 and determines one of the first device 200-1 and the second device 200-2, whose intention information has a greater value, to be a group owner. For example, when the main intention information of the first device 200-1 has a value of "12" and the main intention information of the second device 200-2 has a value of "14", the second device 200-2 determines that the second device 200-2 is a group owner.

The negotiation response frame preferably includes main intention information of the device 200, which has been determined to be a group owner, rather than the main intention information of the second device 200-2. For example, the second device 200-2 generates a negotiation response frame including main intention information "14" when the main intention information of the first device 200-1 is "12" and the main intention information of the second device 200-2 is "14". On the other hand, the second device 200-2 generates a negotiation response frame including main intention information "12" when the main intention information of the first device 200-1 is "12" and the main intention information of the second device 200-2 is "10".

Information included in each of the channel list field and the channel field included in the negotiation response frame varies depending on whether the second device 200-2 is a group owner or a client.

Specifically, the second device 200-2 determines that the second device 200-2 is a group owner when the value of the main intention information of the second device 200-2 is greater than the value of the main intention information of the first device 200-1. In this case, the second device 200-2 may incorporate the main intention information of the second device 200-2 into an intention field of the negotiation response frame, incorporate information regarding channels that can be used as an operation channel of the wireless group into a channel list field of the negotiation response frame, and incorporate one channel of the channel list of the negotiation response frame into a channel field of the negotiation response frame.

On the other hand, the second device 200-2 determines that the second device 200-2 is a client when the value of the main intention information of the second device 200-2 is less than the value of the main intention information of the first device 200-1. In this case, the second device 200-2 may incorporate the main intention information of the first device 200-1 into an intention field of the negotiation response frame, incorporate information regarding channels that can be used as an operation channel of the wireless group into a channel list field of the negotiation response frame, and incorporate information regarding a favorite operation channel of the wireless group or information indicating that there is no favorite operation channel into a channel field of the negotiation response frame.

When the second device 200-2 is determined to be a client, channels included in the channel list field of the negotiation response frame may be determined independent of channels included in the channel list field of the negotiation request frame. The channel included in the channel field of the negotiation response frame may be one of the channels included in the channel list field of the negotiation response frame. In addition, the group performance bitmap field of the performance field may include information indicating whether the second device 200-2 will use the first device 200-1 as a group owner for a temporary wireless group or for a persistent wireless group.

The first device 200-1 that has received the negotiation response frame checks whether or not it is possible to form a group with the second device 200-2 and generates a negotiation confirmation frame in response to the negotiation response frame and transmits the negotiation confirmation frame to the second device 200-2 (S260).

The negotiation confirmation frame includes a performance field, a status field, a channel list field, and a channel field.

When available channels are insufficient or when wireless performance information of the first device 200-1 and the 2002 are not identical, the first device 200-1 may generate and transmit a negotiation confirmation frame including status information "failure" which indicates that negotiation of group owner determination has failed.

On the other hand, when available channels are sufficient and when wireless performance information of the first device 200-1 and the 2002 are identical, the first device 200-1 may generate and transmit a negotiation confirmation frame including status information "success".

Especially, when the first device 200-1 is determined to be a group owner, the first device 200-1 incorporates information regarding channels that can be used as an operation channel of the wireless group into the channel list field of the negotiation confirmation frame, incorporates information regarding a favorite operation channel of the wireless group into the channel field, and incorporates a group performance bitmap field indicating characteristics of the wireless group into the performance field.

When the first device 200-1 is determined to be a group owner, it is preferable that the channel list of the channel list field of the negotiation response frame be included in the channel list field of the negotiation confirmation frame and the channel included in the channel field of the negotiation confirmation frame be one of the channels be included in the channel list of the negotiation response frame.

When the first device 200-1 is determined to be a client, the first device 200-1 incorporates information regarding channels that can be used as an operation channel of the wireless group into the channel list field of the negotiation confirmation frame, incorporates information regarding a favorite operation channel of the wireless group into the channel field, and incorporates a group performance bitmap field indicating characteristics of the wireless group into the performance field.

When the first device 200-1 is determined to be a client, channels included in the channel list of the channel list field of the negotiation confirmation frame may be the same as channels included in the channel list of the channel list field of the negotiation response frame and may also include the channel included in the channel field of the negotiation response frame. Here, it is preferable that the channel in the channel field of the negotiation confirmation frame be identical to the channel in the channel field of the negotiation response frame. It is also preferable that the group performance bitmap field (indicating wireless performance) of the negotiation response frame include information indicating whether the second device 200-2 is to be used as a temporary or persistent group owner.

Although the above embodiment has been described with reference to an example in which the second device 200-2 transmits a probe response frame to the first device 200-1 and the first device 200-1 then transmits a negotiation request frame in response to the probe response frame, the present invention is not limited to this example. The second device 200-2 may also transmit a negotiation request frame in order to form a group if the second device 200-2, which has not formed a group, receives a probe response frame.

In the meantime, a plurality of devices 200 may transmit group negotiation request frames. In this case, one of the devices 200 which has the largest address may transmit a negotiation response frame.

In addition, although the above embodiment has been described with reference to an example in which the second device 200-2 which has received a negotiation request frame determines the group owner, the present invention is not limited to this example. For example, the first device 200-1 may determine the group owner based on a negotiation response frame(s) received from a device(s) within a predetermined time after the first device 200-1 broadcasts a negotiation request frame. In this case, there is an advantage in that it is possible to determine the group owner at a time using at least three devices.

Figure 3:
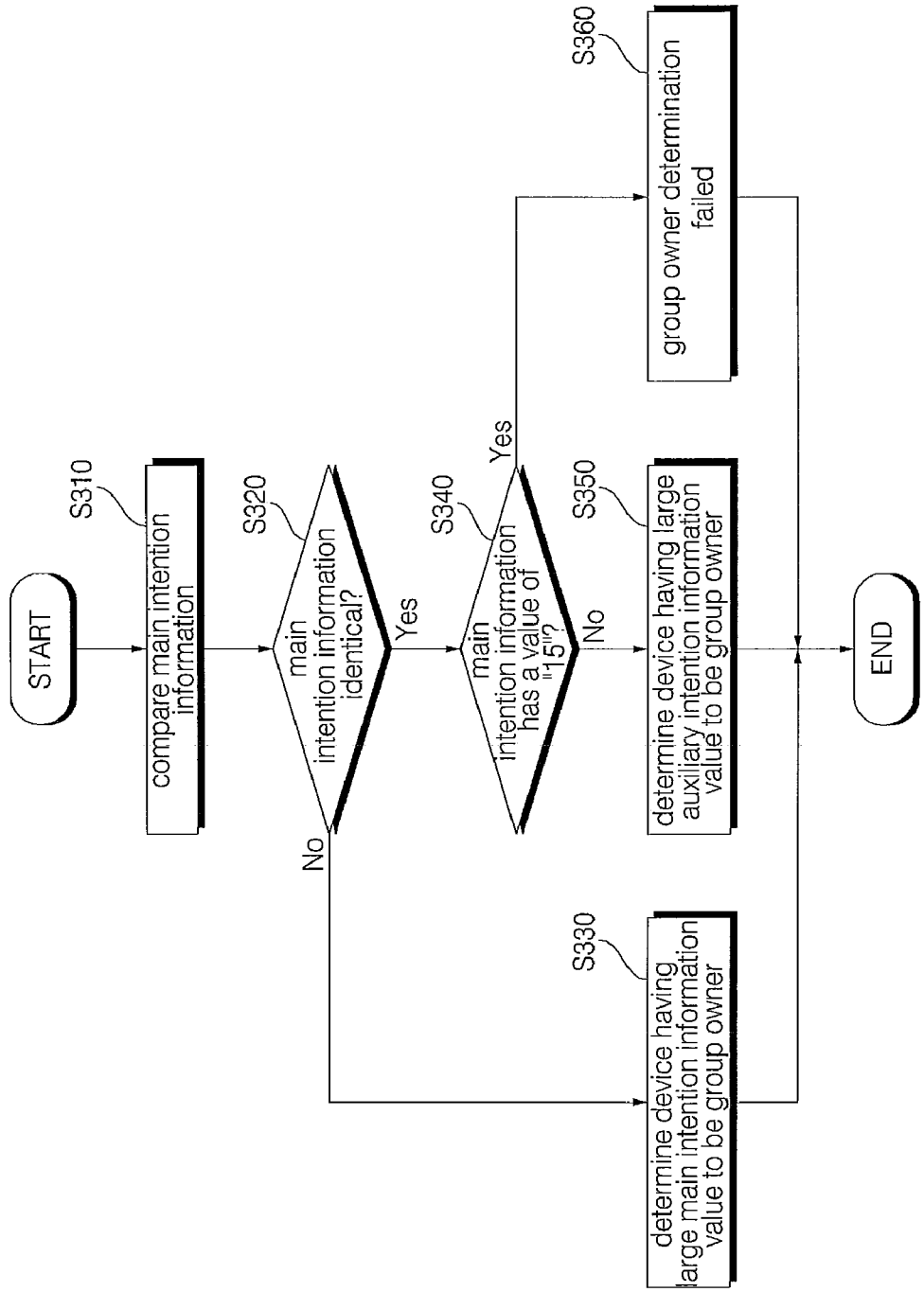
FIG. 3 is a flow chart illustrating a method for determining a group owner using intention information according to an embodiment of the present invention.

FIG. 3 is a flow chart illustrating a method for determining a group owner using intention information according to an embodiment of the present invention.

As shown in FIG. 3, the second device 200-2 compares main intention information of the first device 200-1 included in a negotiation request frame received from the first device 200-1 with main intention information of the second device 200-2 (S310).

When the main intention information of the first device 200-1 and the second device 200-2 are not identical ("No" in step S320), the second device 200-2 determines that one of the first device 200-1 and the second device 200-2 whose main intention information has a greater value is a group owner (S330). That is, the second device 200-2 determines that the first device 200-1 is a group owner if the value of the main intention information of the first device 200-1 is greater than the value of the main intention information of the second device 200-2. On the other hand, the second device 200-2 determines that the second device 200-2 is a group owner if the value of the main intention information of the first device 200-1 is less than the value of the main intention information of the second device 200-2.

When the main intention information of the first device 200-1 and the second device 200-2 are identical ("Yes" in step S320) and the values of the main intention information are not "15" ("No" in step S340), the second device 200-2 determines that one of the first device 200-1 and the second device 200-2 whose auxiliary intention information has a value of "1" is a group owner (S350). However, when the values of the main intention information are "15" ("Yes" in step S340), the second device 200-2 does not determine the group owner (S360). The second device 200-2 generates a negotiation response frame including status information "success" when the second device 200-2 has determined the group owner and generates a negotiation response frame including status information "failure" when the second device 200-2 has not determined the group owner and then transmits the generated negotiation response frame to the first device 200-1.

Each device 200 may determine main intention information based on information indicating power supply status.

The following is a detailed description of a method for determining main intention information.

Figure 4:
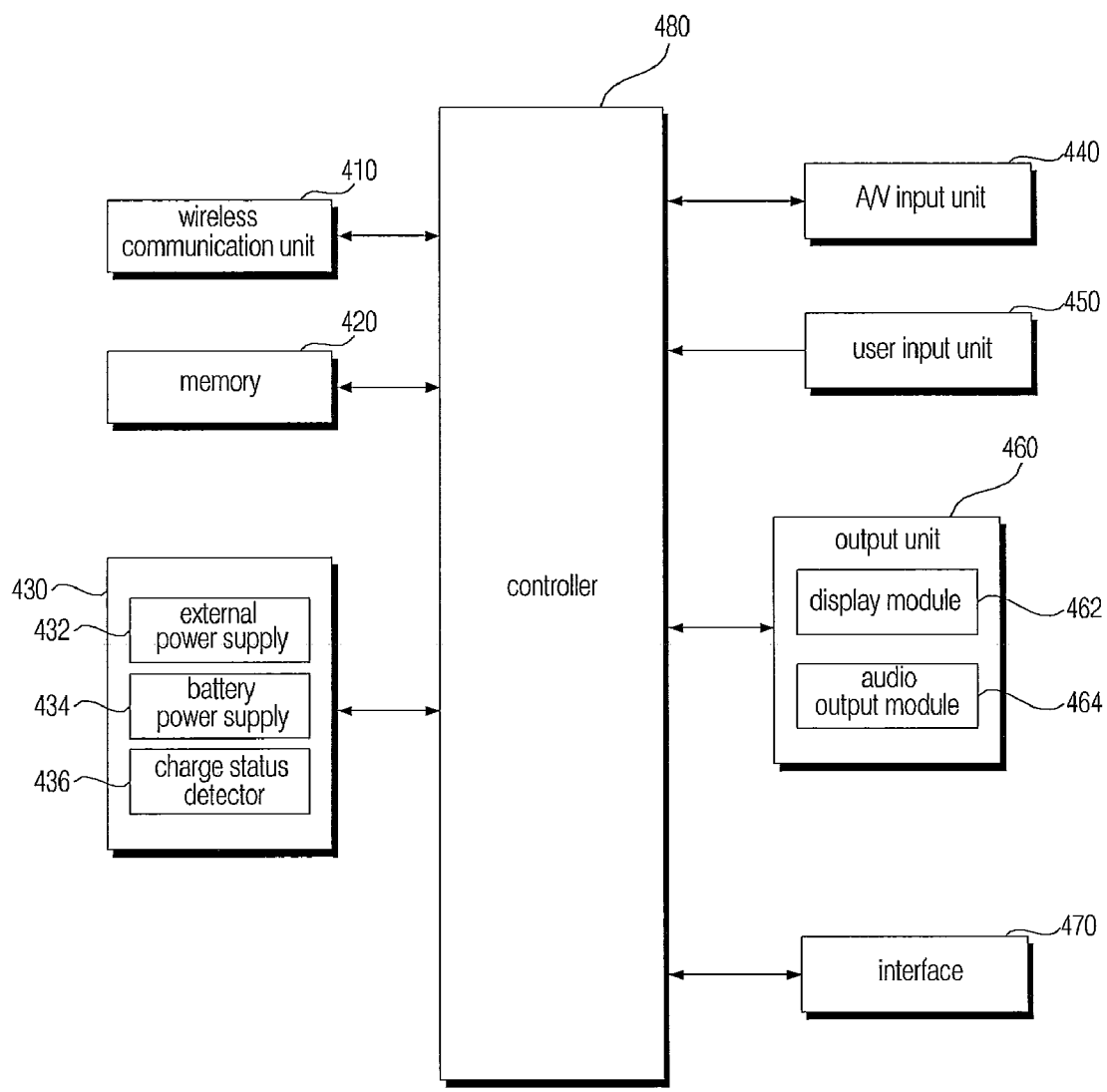
FIG. 4 is a block diagram of a device according to an embodiment of the present invention.

FIG. 4 is a block diagram of a device that can directly communicate with another device in a wireless network according to an embodiment of the present invention.

As shown in FIG. 4, the device 200 may include a wireless communication unit 410, a memory 420, a power supply unit 430, an Audio/Video (A/V) input unit 440, a user input unit 450, an output unit 460, an interface unit 470, and a controller 480. Two or more of these components of the device 200 may be combined into a single component or a single component thereof may be separated into two more components as needed.

The wireless communication unit 410 is a module for communicating with an external device using a wireless LAN or a Wi-Fi network.

The memory 420 may store a program for processing and controlling the controller 480 or may temporarily store input or output data. Specifically, the memory 420 may store intention information set in the device 200.

The memory 420 may include a storage medium of at least one of a flash memory type, a hard disk type, a multimedia card micro type, a card type memory (for example, an SD or XD memory), a RAM, and a ROM. The device 200 may also operate so as to use a web storage that performs the same storage function as the memory on the Internet.

The power supply unit 430 supplies power required to operate the device and includes an external power supply unit 432 that supplies power from an external power source, a battery power supply unit 434 that supplies power from a rechargeable battery, and a charge status detector 436 that detects charge status (for example, remaining battery power) of the battery power supply unit 434.

The device 200 receives power from the external power supply unit 432 when the external power source is connected to the device 200 and receives power from the battery power supply unit 434 when the external power source is not connected to the device 200. In the case where the battery supplies power required to operate the device 200, the charge status detector 436 measures the remaining power of the battery and provides the measured remaining power information to the controller 480.

The A/V input unit 440 serves to receive an audio signal or a video signal and may include a camera and a microphone.

The user input unit 450 may generate key input data based on user input for controlling the operation of the device 200. The user input unit 450 may be implemented as a keypad, a dome switch, or a static pressure or capacitive touch pad which is capable of receiving a command or information by being pushed or touched by a user. Alternatively, the user input unit 450 may be implemented as a wheel, a jog dial or wheel, or a joystick capable of receiving a command or information by being rotated. Still alternatively, the user input unit 450 may be implemented as a finger mouse. In particular, if the user input unit 450 is implemented as a touch pad and forms a mutual layer structure with the display module 462, the user input unit 450 and the display module 462 may be collectively referred to as a touch screen.

The output unit 460 may output audio signals, video signals and alarm signals. The output unit 460 may include the display module 462 and an audio output module 464.

The display module 462 may display various information processed by the device 200. For example, if the device 200 is in a call mode, the display module 462 may display a user interface (UI) or a graphic user interface (GUI) for making or receiving a call. If the device 200 is in a video call mode or an image capturing mode, the display module 462 may display a UI or a GUI for capturing or receiving images.

If the display module 462 and the user input unit 450 form a mutual layer structure and are thus implemented as a touch screen, the display module 462 may be used not only as an output device but also as an input device capable of receiving information by being touched by the user.

If the display module 462 is implemented as a touch screen, the display module 462 may also include a touch screen panel and a touch screen panel controller. The touch screen panel is a transparent panel attached onto the exterior of the device 200 and may be connected to an internal bus of the device 200. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel.

The audio output module 464 outputs audio data that is received from the wireless communication unit 410 or stored in the memory 420. The audio output module 464 may include a speaker or the like.

The interface unit 470 may interface with an external device that can be connected to the device 200. The interface unit 470 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 470 may receive data from an external device or may be powered by an external device. The interface unit 470 may transmit data provided by an external device to other components in the device 200 or may transmit data provided by other components in the device 200 to an external device.

The controller 480 controls the operation of each component of the device 200 and controls the overall operation of the device 200. The controller 480 not only determines main intention information and auxiliary intention information used to determine a group owner but also performs functions to generate a frame to be transmitted to an external device or to analyze a frame received from an external device.

Figure 5:
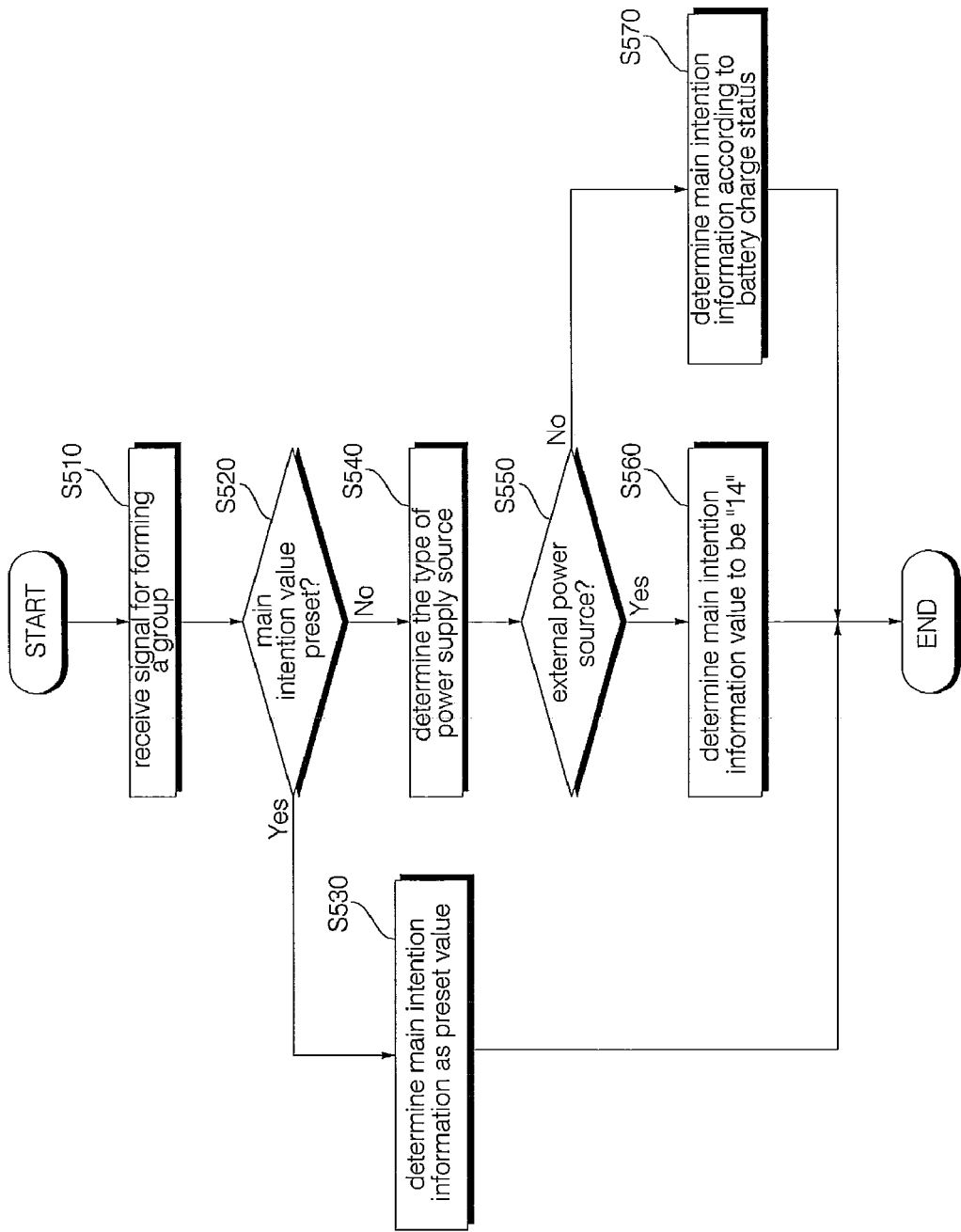
FIG. 5 is a flow chart illustrating a method for determining main intention information according to an embodiment of the present invention.

FIG. 5 is a flow chart illustrating a method for determining main intention information according to an embodiment of the present invention.

As shown in FIG. 5, the controller 480 receives a signal for forming a group (S510). Upon receiving a user command to connect to a wireless network through the user input unit 450 or upon receiving a negotiation request frame through the wireless communication unit 410, the controller 480 determines that a signal for forming a group has been received.

Upon determining that a signal for forming a group has been received, the controller 480 determines whether or not main intention information has been preset in the device 200 (S520). The main intention information may be preset by a user or provider of the device 200.

Upon determining that main intention information has been preset, the controller 480 determines the preset main intention information as main intention information of the device 200 (S530).

Upon determining that main intention information has not been preset, the controller 480 determines the type of the power supply source (S540). Upon determining that the power supply source is an external power source ("Yes" in step S550), the controller 480 determines that the value of the main intention information is "14" which is the second largest of the intention information values for the group owner (S560).

On the other hand, upon determining that the power supply source is a battery rather than an external power source ("No" in step S550), the controller 480 determines main intention information corresponding to the charge status of the battery (S570). For example, the controller 480 may multiply the remaining power of the battery/the capacity of the battery by "13" and determine that the integer component of the result is the value of the group owner intention information. Therefore, the value of the main intention information determined based on the battery storage state may be one of the integers 0 to 13.

That is, (the value of) the main intention information is determined first based on the information preset by the user or provider and secondarily based on whether or not external power is supplied and then based on the remaining battery power.

Although this embodiment has been described with reference to an example in which the main intention information is determined based on the ratio of remaining battery power to the capacity of the battery, the present invention is not limited to this example. For example, the main intention information may also be determined based on the absolute value of the remaining battery power. In this case, it is preferable that the value of the main intention information not be limited to a range of 0 to 15.

In addition, the remaining battery power of each device may be converted into a remaining battery voltage, a remaining battery current, a remaining battery operation time, or the like of the device and the main intention information of each device may then be determined based on the converted value. The main intention information may also be determined based not only on the power supply status but also on information of CPU usage rate and information of the memory capacity of the device.

Further, although this embodiment has been described with reference to an example in which the auxiliary intention information is toggled between 0 and 1, the present invention is not limited to this example. The auxiliary intention information may also be set to an integer based on the memory capacity information and the CPU usage rate information.

Furthermore, although this embodiment has been described with reference to an example in which the main intention information is an integer between 0 to 15 and the auxiliary intention information is 0 or 1, the present invention is not limited to this example. For example, each of the main intention information and the auxiliary intention information may be set to a value other than the integers described above or may be in a data format different from that described above. In addition, although this embodiment has been described with reference to an example in which a device which has the larger main intention information value is determined to be a group owner, the present invention is not limited to this example and a device which has the smaller main intention information value may also be determined to be a group owner.

This embodiment has also been described with reference to an example in which main intention information is determined based on power supply status information. However, the main intention information may also be determined according to a different method. For example, when the main intention information of the devices are identical, the power supply state information may be used as auxiliary intention information.

Further, although this embodiment has been described with reference to an example in which a group owner is determined before direct communication between devices is performed, the present invention is not limited to this example. During direct communication between devices, the group owner may also again determined when the power supply status has changed, when the operating state (for example, the mode) of a device has changed, or when a new device has been added.

Specifically, the power supply status information may change depending on the operating state of each device. For example, supply of power from an external power source to the device may be cut off and the battery may then supply power to the device. Alternatively, supply of power from a battery to the device may be cut off and an external power source may then supply power to the device. Even when the device is driven by power received from a batter, power consumption of the device may vary depending on the type of application running on the device.

Therefore, the group owner may also broadcast a beacon signal including intention information after a group is formed. The client may transmit a response signal including intention information of the client in response to the beacon signal. Then, the group owner may determine a new group owner based on the intention information. Here, it is preferable that the group owner broadcast information of the new group owner upon determining that a new group owner is to be defined.

Although this embodiment has been described with reference to an example in which the user can set main intention information and the device determines the group owner, the present invention is not limited to this example. For example, the user may determine the group owner.

Although the Wi-Fi network has been described as a wireless network for direct communication between devices in this embodiment, the present invention is not limited to the Wi-Fi network. The present invention is applicable to any wireless network which determines which device is to function as an access point in order to allow direct communication between devices.

While preferred embodiments of the present invention have been described above with reference to the drawings, it is apparent that the invention is not limited to the specific embodiments and various modifications can be made by those skilled in the art without departing from the spirit of the invention defined in the claims. Such modifications should not be understood separately from the spirit or scope of the invention.

What is claimed is:

1. A method for determining a group owner that functions as an access point in a wireless network that allows direct communication between devices, the method comprising:
    a first device acquiring first intention information indicating the first device's intention to become a group owner;
    transmitting a negotiation request frame to a second device;
    receiving, from the second device, a negotiation response frame including second intention information indicating the second device's intention to become a group owner responsive to the negotiation request frame; and
    comparing the first intention information and the second intention information and determining, at the first device, that one of the first and second devices is a group owner,
    wherein comparing the first intention information and the second intention information compares the first intention information and the second intention information transmitted in the negotiation request frame and the negotiation response frame, respectively,
    wherein the first intention information is set by information regarding a power supply status of the first device when the intention information has not been set by a user, and
    wherein the information regarding the power supply status is at least one of information indicating whether or not power is supplied from an external power source and information regarding a battery charge status.

2. The method according to claim 1, wherein the group owner is one of the first and second devices which receives power from an external power source.

3. The method according to claim 1, wherein the group owner is determined based on information regarding battery charge status.

4. The method according to claim 1, further comprising transmitting to the second device, upon determining that one of the first and second devices is a group owner, a negotiation confirmation frame including intention information of the device determined to be the group owner.

5. A device for determining a group owner that functions as an access point in a wireless network that allows direct communication between devices, the device comprising:
    a wireless communication unit for performing wireless communication with another device; and
    a controller configured to:
    acquire first intention information indicating the device's intention to become a group owner;
    receive, from the other device, a negotiation response frame including second intention information indicating the other device's intention to become a group owner through the wireless communication unit; and
    compare the first intention information and the second intention information to determine that one of the device and the other device is a group owner,
    wherein the first intention information is set by information regarding a power supply status of the first device when the intention information has not been set by a user, and
    wherein the information regarding the power supply status is at least one of information indicating whether or not power is supplied from an external power source and information regarding a battery charge status.

6. The device according to claim 5, wherein the controller is configured to determine that one of the device and the other device which receives power from an external power source is the group owner.

7. The device according to claim 5, wherein the controller is configured to determine the group owner based on information regarding battery charge status.

8. The device according to claim 5, wherein the controller is configured to transmit, upon determining that one of the device and the other device is a group owner, intention information of the device determined to be the group owner to the other device.

9. The method according to claim 1, wherein the first intention information and the second intention information are numerical values.

10. The device according to claim 5, wherein the first intention information and the second intention information are numerical values.

* * * * *